United States Patent
McCloskey et al.

(10) Patent No.: US 6,399,739 B1
(45) Date of Patent: Jun. 4, 2002

(54) PREPARATION OF POLYCARBONATE HAVING A PREDETERMINED MOLECULAR WEIGHT AND LEVEL OF ENDCAPPING

(75) Inventors: Patrick Joseph McCloskey, Watervliet; Alberto Nisoli, Niskayuna; Warren William Reilly, Northvillew, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/934,929

(22) Filed: Aug. 22, 2001

(51) Int. Cl.[7] .............................................. C08G 64/00
(52) U.S. Cl. ...................................... 528/196; 528/198
(58) Field of Search ................................... 528/196, 198

(56) References Cited

U.S. PATENT DOCUMENTS

| | | |
|---|---|---|
| 3,335,111 A | 8/1967 | Pray et al. |
| 3,820,761 A | 6/1974 | Rigal |
| 3,830,811 A | 8/1974 | Regnier et al. |

FOREIGN PATENT DOCUMENTS

| | | |
|---|---|---|
| JP | 47-30675 | 11/1972 |
| JP | 49-14358 | 4/1974 |
| JP | 50-157265 | 12/1975 |
| JP | 62-112623 | 5/1987 |
| JP | 1-230518 | 9/1989 |
| JP | 2-153925 | 6/1990 |
| JP | 6-21159 | 3/1994 |
| JP | 7-242743 | 9/1995 |
| JP | 7-330910 | 12/1995 |
| JP | 8-337648 | 12/1996 |
| JP | 9-291154 | 11/1997 |
| JP | 10-342 | 1/1998 |

*Primary Examiner*—Terressa M. Boykin
(74) *Attorney, Agent, or Firm*—Andrew J. Caruso; Noreen C. Johnson (57) ABSTRACT

A melt method of preparing polycarbonate having a predetermined number average molecular weight and percent endcapping is described. A computerized process model is used to determine the reaction parameters to be employed in order to furnish the product polycarbonate possessing the desired $M_n$ and %EC. Reaction parameters of importance include a suitable starting molar ratio of diaryl carbonate to dihydroxy aromatic compound, the most appropriate reaction time, reaction temperature and pressure ranges. The target polycarbonate is then prepared using reaction parameters indicated by the process model in a reactor which forms an element of the process model. Characteristics of the reactor which may be included in the process model include agitation rate and reflux ratio during the distillative removal of hydroxy aromatic compound formed as a by-product during the polymerization.

38 Claims, 1 Drawing Sheet

Fig. 1

PREPARATION OF POLYCARBONATE HAVING A PREDETERMINED MOLECULAR WEIGHT AND LEVEL OF ENDCAPPING

BACKGROUND OF THE INVENTION

This invention relates to the melt preparation of polycarbonate using a computerized process model to provide an optimal set of reaction conditions and reaction stoichiometry to effect the conversion of reactant diaryl carbonate and at least one dihydroxy aromatic compound to product polycarbonate having a predetermined molecular weight and level of endcapping.

Increasingly, polycarbonate is being prepared by the melt reaction of a diaryl carbonate with a dihydroxy aromatic compound in the presence of a transesterification catalyst, such as sodium hydroxide. In this "melt" process reactants are introduced into a reactor capable of stirring a viscous polycarbonate melt at temperatures in excess of 300° C. Typically, the reaction is run at reduced pressure to facilitate the removal of by-product aromatic hydroxy compound formed as the diaryl carbonate reacts with the dihydroxy aromatic compound and growing polymer chains. It is frequently desirable to prepare polycarbonates having a high level of endcapped polymer chain ends in order to promote polymer stability and to reduce the tendency to accumulate a static charge of molded articles prepared from the polycarbonate. Thus, it is desirable to maximize the percentage of polymer chains terminating with aryloxy groups, the "endcapped" chains, while minimizing the percentage of polymer chains terminating with hydroxyl groups.

According to the principles of condensation polymerization established by Flory and others, it should be possible to prepare polycarbonate, for example bisphenol A polycarbonate, in which all of the chains terminate in aryloxy groups or hydroxyl groups simply by adjusting the ratio of diaryl carbonate to dihydroxy aromatic compound. In a condensation polymerization taking place in a melt reaction between diphenyl carbonate and bisphenol A, for example, the use of excess diphenyl carbonate, wherein the molar ratio of diphenyl carbonate to bisphenol A is greater than 1.0, might be expected to provide a polycarbonate in which all of the polymer chains terminate in phenoxy groups, the molecular weight of said polycarbonate being determined by the extent to which the molar ratio of diphenyl carbonate to bisphenol A exceeds 1.0. In practice, however, it is found difficult if not impossible to achieve the complete endcapping of polycarbonate prepared in this manner. It is found that the use of excess diaryl carbonate in the melt reaction of a diaryl carbonate with an dihydroxy aromatic compound slows the rate of polymerization, and requires the use of higher catalyst levels and higher reaction temperatures in order to achieve high molecular weight polycarbonate. The high molecular weight polycarbonate so prepared still contains a significant percentage chain ends terminating in hydroxy groups.

In practice, the melt polymerization reaction of diaryl carbonates with dihydroxy aromatic compounds typically involves contacting the diaryl carbonate with the dihydroxy aromatic compound in an amount such that the molar ratio of diaryl carbonate to dihydroxy aromatic compound is initially in a range between about 1.05 and about 1.2. High molecular weight polymer is obtained as the reaction proceeds and by-product hydroxy aromatic compound as well as a portion of the excess diaryl carbonate is removed from the reaction mixture during the polymerization reaction. The "effective molar ratio" of diaryl carbonate to dihydroxy aromatic compound, the molar ratio of carbonate groups to structural units derived from the dihydroxy aromatic compound in the product polycarbonate, is preferably in a range between about 1.01 and about 1.03. When the effective molar ratio of diaryl carbonate to dihydroxy aromatic compound is in a range between about 1.01 and about 1.03, polycarbonate having a high number average molecular weight, $M_n$ in a range between about 8,000 and about 28,000 Daltons, is obtained. Frequently, however, in order to achieve a product polycarbonate having an effective molar ratio of diaryl carbonate to dihydroxy aromatic compound in a range between about 1.01 and about 1.03, a relatively high starting molar ratio of diaryl carbonate to dihydroxy aromatic compound must be employed and the polymerization mixture must be heated for a prolonged period of time in order to overcome low reaction rates, which are the result of lower concentrations of reactive hydroxyl groups, and to remove at least some of the excess diaryl carbonate employed. During such prolonged heating undesired rearrangement products, such as a Fries rearrangement product, may be formed.

The effective molar ratio of diaryl carbonate to dihydroxy aromatic compound actually observed is dependent upon the various reaction parameters employed, such as reaction time, temperature and pressure as well as the starting molar ratio of the reactants, and catalyst concentration and catalyst identity. Moreover, the effective molar ratio of diaryl carbonate to dihydroxy aromatic compound obtained in the product polycarbonate is affected by those characteristics of the reactor employed which affect the rates of removal of by-product aromatic hydroxy compound and excess diaryl carbonate, said characteristics of the reactor employed include the shape and geometry of moving internal components of the reactor, such as a stirrer, the agitation rate, and the reflux ratio operative during distillative removal of by-product hydroxy aromatic compound.

It would be a significant advantage to prepare polycarbonate by a melt polymerization method in which the molecular weight of the product polycarbonate and the level of endcapping could be selected, and thereafter, using a process model, reaction parameters could be determined which would most efficiently provide the product polycarbonate having the predetermined level of endcapping and the predetermined molecular weight. It would be particularly desirable to determine, for a given reactor operating under a given set of reactor conditions, said reactor conditions comprising reaction temperature, reaction pressure, reaction time and reaction catalyst concentration and catalyst identity, what the proper initial molar ratio of diaryl carbonate to dihydroxy aromatic compound should be in order to obtain a product polycarbonate having an effective molar ratio of between about 1.01 to about 1.03. Moreover, it would be desirable to employ the same process model to allow the minimization of Fries product in the product polycarbonate.

BRIEF SUMMARY OF THE INVENTION

The present invention provides a method for making a polycarbonate comprising structural units derived from at least one dihydroxy aromatic compound and at least one diaryl carbonate, said method comprising the following steps:

Step (I) selecting a desired molecular weight and percent endcapping of the product polycarbonate;

Step (II) consulting a computerized process model to obtain a starting molar ratio of diaryl carbonate to dihydroxy aromatic compound;

Step (III) charging an amount of dihydroxy aromatic compound and diaryl carbonate in the molar ratio indicated by the process model to a reactor to form a reaction mixture, said reactor being an element of said process model; and Step (IV) heating at a temperature and pressure for a time period indicated by the process model in the presence of a transesterification catalyst while distilling from the reactor a mixture comprising by-product hydroxy aromatic compound and diaryl carbonate to provide a polycarbonate having an effective molar ratio of diaryl carbonate to dihydroxy aromatic compound and having the desired molecular weight and percent endcapping.

The present invention further relates to a method for making a polycarbonate which minimizes the amount of Fries product present in the product polycarbonate.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of a diaryl carbonate with a dihydroxy aromatic compound.

As used herein, the term "desired molecular weight" and "predetermined molecular weight" are used interchangeably.

As used herein the term "percent endcap", abbreviated "%EC", refers to the percentage of polycarbonate chain ends which are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein, the term "desired level of endcapping" and "predetermined level of endcapping" are used interchangeably". The term "level of endcapping" refers to the percent endcapping as defined above.

As used herein, the expression "having the desired molecular weight and percent endcapping" when used to describe a product polycarbonate made according to the method of the present invention, means that the molecular weight and percent endcapping of said polycarbonate closely approximate the molecular weight and percent endcapping initially selected. By "closely approximate" it is meant that the values of the product polycarbonate molecular weight and percent endcapping are within about 20 percent of the values of molecular weight and percent endcapping initially selected.

As used herein the expression "the product polycarbonate has values of $M_n$, and %EC in accord with those the process model predicts" means that the values of $M_n$ and %EC which the process model predicts are within about 20 percent of the values of $M_n$ and %EC which are experimentally measured for the product polycarbonate.

"BPA" is herein defined as bisphenol A or 2,2-bis(4-hydroxyphenyl)propane.

"Catalyst system" as used herein refers to the catalyst or catalysts that catalyze the transesterification of the dihydroxy aromatic compound with the diaryl carbonate in the preparation of melt polycarbonate.

"Catalytically effective amount" refers to the amount of the catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product comprises structure V below, which affords 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "dihydroxy aromatic compound" means a an aromatic compound which comprises two hydroxy groups, for example a bisphenol such as bisphenol A.

As used herein the term "hydroxy aromatic compound" means a phenol, such as phenol or p-cresol, comprising a single reactive hydroxy group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

The present invention provides a method of preparing polycarbonate comprising structural units derived from at least one dihydroxy aromatic compound and at least one diaryl carbonate, said polycarbonate having a predetermined value of $M_n$, and percent endcapping, said method comprising consulting a computerized process model to obtain a starting molar ratio of dihydroxy aromatic compound to diaryl carbonate, charging an amount of dihydroxy aromatic compound and diaryl carbonate in the molar ratio indicated by the process model to a reactor to form a reaction mixture, said reactor being an element of said process model; and heating at a temperature and pressure and for a time period indicated by the process model in the presence of a transesterification catalyst while distilling from the reactor a mixture comprising by-product hydroxy aromatic compound and diaryl carbonate to provide a polycarbonate having an effective molar ratio of diaryl carbonate to dihydroxy aromatic compound and having the desired molecular weight and percent endcapping.

The process model employed according to the method of the present invention may be determined using known computer simulation models, such as POLYMERS PLUS™ developed by Aspen Technology Inc., Cambridge, Mass.

Figure 1:
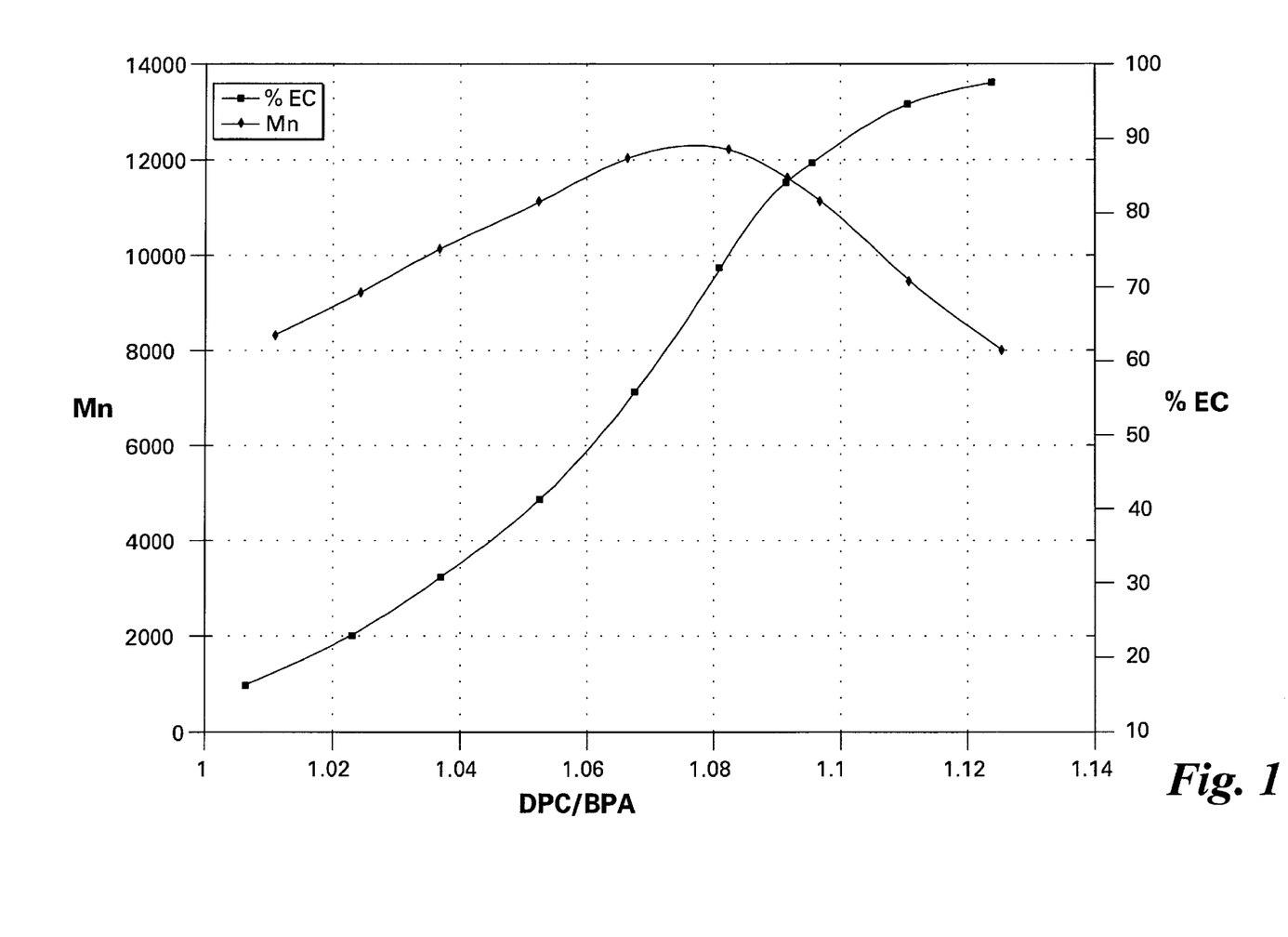
FIG. 1 shows the effect of reaction stoichiometry on the product polycarbonate molecular weight and percent endcapping predicted by a process model used according to the method of the present invention

In one aspect of the present invention the process model predicts product traits of polycarbonate prepared in a continuous reactor. Characteristics of the reactor such as its volume, feed input rates and temperature of operation are employed, making the reactor actually used to prepare polycarbonate an element of the process model. In practicing the method of the present invention in instances where the reactor is a continuous reactor, the variables reactor temperature, reactor pressure, reactor volume, agitation rates, feed rates of dihydroxy aromatic compound, catalyst and diaryl carbonate are entered into the model and the process model outputs molecular weight, percent endcapping and Fries product level are obtained. The input variables, feed rates of dihydroxy aromatic compound and diaryl carbonate, provide a starting molar ratio of diaryl carbonate to aromatic dihydroxy compound. The input variable, reactor volume, serves in the present example as a surrogate for reaction time. The process model outputs are then compared with predetermined desired values of molecular weight, percent endcapping and Fries product level. An iterative process is then carried out in which the input variables are changed until the process model outputs and the predetermined desired values of molecular weight, percent endcapping and Fries product level coincide or have achieved the maximum coincidence possible. The input variables used which achieve the best match between the predetermined desired values of molecular weight, percent endcapping and Fries product level and the process model outputs for these product traits, are then employed in the actual preparation of the polycarbonate itself. FIG. 1 illustrates the molecular weight (Mn) and percent endcapping outputs of the process model for a continuous process when all of the input parameters, for example reactor temperature, reactor pressure and catalyst flow rate, are held constant except for the flow rates of dihydroxy aromatic compound and diaryl carbonate which are varied in order to achieve the indicated molar ratios of diaryl carbonate to dihydroxy aromatic compound.

The values of the input parameters, such as reaction temperature, pressure and feed input rates may be a range of values, for example the temperatures in polymerization reactions conducted in a staged reactor, such as a series of interconnecting continuous reactors each of which is operated at a different temperature. Similarly, a range of values for the input variable pressure may be employed.

In one embodiment, Step (II) of the method of the present invention, "consulting a computerized process model to obtain a starting molar ratio of diaryl carbonate to dihydroxy aromatic compound", comprises an iterative method comprising varying the starting molar ratio, reaction temperature range, reaction pressure range, and reaction time using a computerized process model and computing the values of $M_n$ and %EC for the product polycarbonate until the maximum coincidence possible between the calculated values and the desired molecular weight and percent endcapping is achieved.

In one aspect of the present invention the dihydroxy aromatic compound employed is a bisphenol having structure I wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–3; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Suitable bisphenols I according to the method of the present invention include bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

In one aspect of the present invention the diaryl carbonate has structure II wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and p and q are independently integers 0–5.

Diaryl carbonates suitable for use according to the method of the present invention are illustrated by diphenyl carbonate, bis(4-methylphenyl) carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl) carbonate, bis(2-nitrophenyl) carbonate, and bis(methyl salicyl) carbonate (CAS No. 82091-12-1).

The reaction between at least one dihydroxy aromatic compound and at least one diaryl carbonate is, according to the method of the present invention, catalyzed by a transesterification catalyst which in one embodiment of the present invention is a quaternary ammonium compound having structure III wherein $R^5$–$R^8$ are independently a $C_1$–$C_{20}$ aliphatic radical, $C_4$–$C_{20}$ cycloaliphatic radical or a $C_4$–$C_{20}$ aromatic radical and $X^-$ is an organic or inorganic anion.

The anion, $X^-$, is illustrated by hydroxide, halide, carboxylate, phenoxide, sulfonate, sulfate, carbonate, bicarbonate and the like.

Suitable organic ammonium compounds comprising structure III are illustrated by tetramethyl ammonium hydroxide, tetrabutyl ammonium hydroxide, tetramethyl ammonium acetate, tetramethyl ammonium formate and tetrabutyl ammonium acetate.

In an alternate embodiment of the present invention the transesterification catalyst is a quaternary phosphonium ion having structure IV wherein $R^5$–$R^8$ and $X^-$ are defined as in structure III.

Suitable quaternary phosphonium compounds comprising structure IV are illustrated by tetramethyl phosphonium hydroxide, tetramethyl phosphonium acetate, tetramethyl phosphonium formiate, tetrabutyl phosphonium hydroxide, and tetrabutyl phosphonium acetate.

Where $X^-$ is a polyvalent anion such as carbonate or sulfate it is understood that the positive and negative charges in structures III and IV are properly balanced. For example, where $R^5$–$R^8$ in structure IV are each methyl groups and $X^-$ is carbonate, it is understood that $X^-$ represents ½ $(CO_3^{-2})$.

In one aspect of the present invention a mixture of quaternary onium compounds III and IV is employed. Where onium compounds III or IV or a mixture thereof serve as the transesterification catalyst, said catalyst is employed in an amount corresponding to between about $1 \times 10^{-8}$ and about $1.0 \times 10^{-3}$ moles of catalyst per mole dihydroxy aromatic compound employed.

In another aspect of the present invention the transesterification catalyst further comprises at least one alkali metal hydroxide, alkaline earth hydroxide or a mixture thereof in addition to onium compound III or IV or a mixture thereof. For example, the transesterification catalyst may consist of a mixture of tetrabutyl phosphonium acetate and sodium hydroxide. In instances where such a combination of catalysts is employed the alkali metal hydroxide or alkaline earth hydroxide is employed in an amount corresponding to between about $1 \times 10^{-8}$ and about $1 \times 10^{-5}$ moles metal hydroxide per mole of dihydroxy aromatic compound employed. Suitable alkaline earth metal hydroxides include magnesium hydroxide and calcium hydroxide. Suitable alkali metal hydroxides include lithium hydroxide, sodium hydroxide and potassium hydroxide.

In another embodiment of the present invention an alkaline earth metal hydroxide, an alkali metal hydroxide, or a mixture thereof may be the only transesterification catalyst present. The alkali metal hydroxide or alkaline earth hydroxide is employed in an amount corresponding to between about $1 \times 10^{-8}$ and about $1 \times 10^{-5}$ moles metal hydroxide per mole of dihydroxy aromatic compound employed. Suitable alkaline earth metal hydroxides include magnesium hydroxide and calcium hydroxide. Suitable alkali metal hydroxides include lithium hydroxide, sodium hydroxide and potassium hydroxide.

In another embodiment of the present invention the transesterification catalyst is at least one alkali metal salt of a carboxylic acid, or an alkaline earth metal salt of a carboxylic acid, or a mixture thereof. Suitable alkali metal salts of carboxylic acids include sodium acetate, lithium acetate and sodium butyrate. Suitable alkaline earth metal salts of carboxylic acids include calcium acetate, magnesium acetate and calcium butyrate. In some instances the transesterification catalyst may be both an alkaline earth metal carboxylate and an alkali metal carboxylate as in the case of disodium magnesium ethylene diamine tetraacetate, $Na_2MgEDTA$. In embodiments of the present invention in which the transesterification catalyst is at least one alkali metal salt of a carboxylic acid, or an alkaline earth metal salt of a carboxylic acid, or a mixture thereof, the catalyst is present in an amount corresponding to between about $1 \times 10^{-8}$ and about $5 \times 10^{-4}$ moles catalyst per mole of dihydroxy aromatic compound employed.

In yet another embodiment of the present invention the transesterification catalyst comprises the salt of a nonvolatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids according the present invention are alkali metal salts of phosphites; alkaline earth metal salts of phosphites; alkali metal salts of phosphates; and alkaline earth metal salts of phosphates. Suitable salts of nonvolatile acids include $NaH_2PO_3$, $NaH_2PO_4$, $Na_2H_2PO_3$, $KH_2PO_4$, $CsH_2PO_4$, $Cs_2H_2PO_4$, and a mixture thereof In one embodiment, the salt of the nonvolatile acid is $CsH_2PO_4$. In one embodiment of the present invention the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst. Where the catalyst comprises the salt of a non-volatile acid said catalyst is present in an amount corresponding to between about $1 \times 10^{-8}$ and about $3.5 \times 10^{-4}$ moles of salt of non-volatile acid per mole of dihydroxy aromatic compound employed. Where the catalyst comprises the salt of a non-volatile acid and a basic co-catalyst, said basic co-catalyst is present in an amount corresponding to between about $1 \times 10^{-8}$ and about $1.0 \times 10^{-5}$ moles of basic co-catalyst per mole of dihydroxy aromatic compound employed.

According to the method of the present invention, following selection of the desired molecular weight and percent endcapping of a target polycarbonate, a computerized process model is consulted in order to determine the starting molar ratio of diaryl carbonate to dihydroxy aromatic compound. The process model uses the desired molecular weight and percent endcapping to calculate both the starting molar ratio and the effective molar ratio of diaryl carbonate to dihydroxy aromatic compound required in order to achieve said molecular weight and percent endcapping. As discussed earlier, the effective molar ratio is the molar ratio of carbonate groups to structural units derived from the dihydroxy aromatic compound in the product polycarbonate, and is preferably in a range between about 1.01 and about 1.03. When the effective molar ratio of diaryl carbonate to dihydroxy aromatic compound is in a range between about 1.01 and about 1.03, polycarbonate having a high molecular weight, $M_n$ in a range between about 8,000 and about 28,000 Daltons, is obtained. The process model is able to predict accurately as a function of reaction temperature, reaction pressure, reaction time, and other attributes of the particular reactor employed, the extent to which starting diaryl carbonate is entrained out of the reaction mixture with the by-product hyrdroxy aromatic compound being distilled from the reaction mixture. Attributes of the reactor which affect the degree to which diaryl carbonate is entrained out of the reaction mixture together with by-product hydroxy aromatic compound include whether the reactor is a continuous or batch reactor, the shape and geometry of moving internal components of the reactor, such as a stirrer, the agitation rate, and the reflux ratio operative during the distillative removal of by-product hydroxy aromatic compound from the reaction mixture. Thus, the process model is able to calculate the starting molar ratio of diaryl carbonate to dihydroxy aromatic compound needed to offset this loss mechanism. Further, the process model is able to balance the effects of reaction temperature, reaction pressure, agitation rate and reaction time in order to maximize the efficiency, i.e. to provide the maximum throughput rates for continuous reactors or the shortest possible reaction time for batch reactors, of the reactor used in the polymerization reaction, within the normal constraints of permissible temperature and pressure ranges, and agitation rates.

The effect of catalyst identity is incorporated into the process model using known or readily determined rates of polymerization of diaryl carbonates and dihydroxy aromatic compounds in the presence of a given catalyst. Additionally, rate constants for the Fries product formation may be incorporated into the process model by determining the rate constant for Fries product formation in an appropriate model system and incorporating said rate constant into the process model. For example, the rate constant for Fries rearrangement of a model system, di-p-cumyl carbonate, in the presence of the transesterification catalyst, tetrabutyl phosphonium acetate (TBPA), at a given temperature, may be used in the process model to predict the amount of Fries product which will be present in a bisphenol A polycarbonate prepared by reaction of bisphenol A with diphenyl carbonate in the presence of (TBPA) under the same similar conditions.

Typically, the method of the present invention employs a starting molar ratio of between about 1.00 and about 1.20, preferably between about 1.03 and about 1.10. FIG. 1 illustrates the sensitivity of molecular weight, $M_n$, and percent endcap, %EC, predicted by the process model to changes in the starting molar ratio of diphenyl carbonate (DPC) to bisphenol A (BPA) for the melt polymerization of DPC and BPA under a given set of reaction conditions in a particular reactor. DPC and BPA represent behavior typical of a variety of diaryl carbonates and dihydroxy aromatic compounds respectively. Very high levels of endcapping are observed to come at the expense of molecular weight, $M_n$. The graph in FIG. 1 shows that if the product polycarbonate has a desired number average molecular weight of about 12,000 Daltons, the achievable range of percent endcapping values will be in a range between about 55% and about 70% depending on the starting molar ratio. Thus, a range of percent endcapping is achievable for polycarbonates having the same molecular weight simply by varying the starting molar ratio of diphenyl carbonate to bisphenol A. Where it is intended that the desired values of $M_n$ and %EC of the product polycarbonate be simultaneously maximized (i.e. at the point where the two curves shown in FIG. 1 intersect) the process model predicts an $M_n$ value of between about 11,000 and about 12,000 Daltons and a percent endcapping of between about 80 and about 90%.

According to the method of the present invention the desired number average molecular weight, $M_n$, of the product polycarbonate is typically in a range between about 8,000 and about 28,000 Daltons; preferably in a range between about 8,000 and about 15,000 Daltons. The desired percent endcapping is typically in a range between about 50 and about 100 percent, preferably between about 60 and about 90 percent.

The reaction temperature indicated by the process model according to the method of the present invention is typically in a range between about 150 and about 350° C., preferably between about 170 and about 310° C. The reaction temperature is generally varied during a polymerization reaction, for example heating at 170° C. during an initial stage of the reaction and then raising the reaction temperature to 260° C. during a subsequent stage of the reaction. The reaction pressure indicated by the process model according to the method of the present invention is typically in a range between about ambient pressure and about 0.01 Torr. The reaction pressure may likewise be varied throughout the course of the polymerization reaction in order to facilitate the orderly removal of by-product hydroxy aromatic compound and to drive the polymerization reaction toward completion. The process model typically indicates using staged reductions in pressure over the course of the polymerization reaction.

Reaction times required to achieve a desired molecular weight and percent endcap are also indicated by the process model and are typically in a range between about 1 and about 12 hours, preferably between about 1 and about 6 hours and still more preferably between about 1 and about 2 hours.

The process model according to the method of the present invention is further able to predict the level of Fries product in the product polycarbonate, said product polycarbonate typically having between about 100 and about 3000, preferably between about 100 and about 1000 parts per million (ppm) Fries product. Structure V below illustrates the Fries product structure present in a polycarbonate prepared from bisphenol A. As indicated in the drawing of structure V, the Fries product may serve as a site for polymer branching, the wavy lines

∽∽∽ indicating polymer chain structure.

V

In general the level of Fries product present in the product polycarbonate is determined by effecting a complete hydrolysis of the product polycarbonate to its component dihydroxy aromatic monomer and Fries products derived therefrom. The Fries product present in a polycarbonate prepared using bisphenol I as a starting monomer affords upon complete hydrolysis carboxy bisphenol VI

VI wherein $R^1$, W, m, and n are defined as in structure I. Similarly, a product polycarbonate prepared according to the present invention employing bisphenol A as the starting dihydroxy aromatic compound affords Fries product VII

VII upon complete hydrolysis.

In one embodiment of the present invention, Step(I) comprises selecting a desired number average molecular weight, $M_n$, of between about 8,000 and about 28,000 Daltons and a percent endcapping of between about 50 and about 100 percent for a target bisphenol A polycarbonate to be prepared from bisphenol A and diphenyl carbonate in the presence of a transesterification catalyst, tetrabutyl phosphonium acetate (TBPA), said catalyst being used in an amount corresponding to between about $1\times10^{-8}$ and about $1\times10^{-3}$ moles TBPA per mole bisphenol A. In Step (II), a computerized process model is then consulted, said computerized process model indicating a starting molar ratio of diphenyl carbonate to bisphenol A, a reaction temperature range, a reaction pressure range, and a reaction time which will provide an effective molar ratio of diphenyl carbonate to bisphenol A for the product polycarbonate in a range between about 1.00 and about 1.03. Consulting a computerized process model to obtain a starting molar ratio of diphenyl carbonate to bisphenol A, reaction temperature and pressure ranges, and reaction time to provide an effective molar ratio of diphenyl carbonate to bisphenol A for the product polycarbonate in a range between about 1.00 and about 1.03 comprises an iterative method comprising varying the starting molar ratio, reaction temperature range, reaction pressure range, and reaction time using a computerized process model and computing the values of $M_n$, and %EC for the product polycarbonate until the maximum coincidence possible between the calculated values and the desired molecular weight and percent endcapping is achieved. The starting molar ratio of diphenyl carbonate to bisphenol A indicated by the process model is in a range between about 1.00 and about 1.20. The reaction temperatures indicated by the process model are in a range between about 170 and about 310° C. The reaction pressures indicated by the process model are in a range between about atmospheric pressure and about 0.01 Torr. The reaction time indicated by the process model is in a range between about 1 and about 3 hours. The reactor is then charged with the reactants, bisphenol A and diphenyl carbonate in the molar ratio indicated by the process model. The transesterification catalyst is added and the reaction mixture is heated in the temperature and pressure ranges indicated by the process model for a period of time indicated by the process model while distilling by-product phenol from the reaction mixture. The product polycarbonate having a number average molecular weight, $M_n$, of between about 8,000 and about 28,000 Daltons and a percent endcapping of between about 50 and about 100 percent, contains between about 100 and about 3000, preferably between about 100 and about 1000 parts per million (ppm) Fries product V which affords 2-carboxy bisphenol A, VII, upon complete hydrolysis of the product polycarbonate.

In an alternate embodiment of the present invention a desired number average molecular weight, $M_n$, of between about 8,000 and about 28,000 Daltons and a percent endcapping of between about 50 and about 100 percent is selected for a target bisphenol A polycarbonate to be prepared from bisphenol A and diphenyl carbonate in the presence of a transesterification catalyst, tetrabutylphosphonium acetate (TBPA), said catalyst being used in an amount corresponding to between about $1\times10^{-8}$ and about $1\times10^{-3}$ moles TBPA per mole bisphenol A, together with sodium hydroxide, said sodium hydroxide being used in an amount corresponding to between about $1\times10^{-8}$ and about $1\times10^{-5}$ moles sodium hydroxide per mole bisphenol A. The process model is then consulted to provide a starting molar ratio of diphenyl carbonate to bisphenol A, reaction temperature and pressure ranges, and reaction time to provide an effective molar ratio of diphenyl carbonate to bisphenol A for the product polycarbonate in a range between about 1.00 and about 1.03. The starting molar ratio of diphenyl carbonate to bisphenol A indicated by the process model is in a range between about 1.00 and about 1.20. The reaction temperatures indicated by the process model are in a range between about 170 and about 310° C. The reaction pressures indicated by the process model are in a range between about atmospheric pressure and about 0.01 Torr. The reaction time indicated by the process model is in a range between about 1 and about 3 hours. The reactor is then charged with the reactants, bisphenol A and diphenyl carbonate in the molar ratio indicated by the process model. The transesterification catalyst is added and the reaction mixture is heated in the temperature and pressure ranges indicated by the process model for a period of time indicated by the process model while distilling by-product phenol from the reaction mixture. The product polycarbonate having a number average molecular weight, $M_n$, of between about 8,000 and about 28,000 Daltons and a percent endcapping of between about 50 and about 100 percent, contains between about 100 and about 3000, preferably between about 100 and about 1000 parts per million (ppm) Fries product V which affords 2-carboxy bisphenol A, VII, upon complete hydrolysis of the product polycarbonate.

In embodiments of the present invention involving a continuous process, a desired molecular weight and percent endcap of the product polycarbonate are selected, and the computerized process model is consulted to obtain a starting molar ratio of diaryl carbonate to dihydroxy aromatic compound. Dihydroxy aromatic compound, diaryl carbonate, and transesterification catalyst are then continuously charged to the reactor in the molar ratios indicated by the process model to form a reaction mixture, said reactor being an element of said process model. The reaction mixture is then heated at a temperature and pressure indicated by the process model in the presence of the catalyst while distilling from the reactor a mixture comprising by-product hydroxy aromatic compound and diaryl carbonate to provide a polycarbonate having an effective molar ratio of diaryl carbonate to dihydroxy aromatic compound and having the desired molecular weight and percent endcap. The reactor may be equipped with one or more sensors, such as an internal viscometer, which continuously monitors the viscosity of the product polycarbonate. In some instances the viscosity measured for the product polycarbonate diverges from the expected viscosity of the product polycarbonate having the molecular weight and percent endcap initially selected. In one embodiment of the present invention the computerized process model further comprises a feedback control algorithm which compares the measured viscosity of the product polycarbonate to that corresponding to the initially selected molecular weight and percent endcap, and adjusts reaction parameters, such as reaction temperature, reaction pressure, feed rate, catalyst concentration, reflux ratio, and molar ratio of dihydroxy aromatic compound to achieve the viscosity corresponding to the desired molecular weight and percent endcap.

Polycarbonates prepared using the method of the present invention may be blended with conventional additives such as heat stabilizers, mold release agents and UV stabilizers and molded into various molded articles such as optical disks, optical lenses, automobile lamp components and the like. Further, the polycarbonates prepared using the method of the present invention may be blended with other polymeric materials, for example, other polycarbonates, polyestercarbonates, polyesters and olefin polymers such as ABS.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in °C.

GENERAL PROCEDURE FOR BUILDING AND USING THE PROCESS MODEL

The process model was built using one chemical reactor for each reaction step involved, wherein each reaction step was characterized by a temperature, a pressure, a residence time, a mode of operation (batch, continuous stirred tank, or continuous plug flow reactor), and a vapor removal rate. The reaction between a diaryl carbonate and a dihydroxy aromatic compound was considered to have two fundamental stages, an initial oligomerization stage, and a subsequent polycondensation stage. For the oligomerization stage which may comprise several reaction steps, the vapor removal was determined by phase equilibrium, meaning that the liquid melt remaining in the reactor and the and the vapor leaving the reactor are assumed to be in phase equilibrium. For the polycondensation stage, which may likewise comprise several reaction steps, the vapor removal was set by a mass transfer parameter (a mass transfer coefficient multiplied by an interfacial area characteristic of the reactor). The mass transfer parameter depended upon the reactor geometry and internals, the reactor agitation rate, as well as on the operating conditions and the viscosity of the polymer.

With the process model in hand, the kinetic, thermodynamic, and mass transfer parameters were specified and the feed stream flow rates and the operating conditions (temperature, pressure and residence time) of the reactor or series of reactors was set. The various kinetic, thermodynamic and mass transfer parameters were obtained from the literature or from experimental data. One or more of these parameters required some slight numerical adjustment in order to obtain closer agreement between the process model and laboratory and plant polymerization data. This comparison between experimental results and those obtained from the process model, and subsequent adjustment of one or more of the kinetic, thermodynamic, and mass transfer parameters served to validate the process model as well as to improve the predictive capability of the process model.

The process model, having been validated, was then used to predict molecular weight, endcap and Fries byproduct level given specific values of the input variables. The use of the process model in this manner is referred to as the "simulation mode". In addition to the simulation mode the model could also be used in the "design mode", meaning that a set of desired process model output values (molecular weight, endcap, and Fries byproduct level) were set, and a set of process model inputs (temperature, pressure, residence time, reactor agitation rate, catalyst type and catalyst level, initial molar ratio) were sought which provided the desired output. There are several different algorithms available for use in the design mode. One such algorithm uses an optimization solver, in which the input variables are varied simultaneously to minimize the objective function, which is typically given by the sum of the errors between the desired values of the outputs and the values calculated by the model for a specific set of inputs. An alternate algorithm can simply be a "shooting method" in which the input variables are changed within a certain range, and the output variables are calculated until they are within a certain tolerance of the desired outputs. A very useful tool for using the shooting method in the design mode, is to do sensitivity analysis of the outputs (in simulation mode) with respect to the input variables. That will identify the inputs toward which the outputs show the greatest sensitivity and also will narrow the range of the input variables. Another approach for using the model in "design mode" is what is sometimes called a "virtual DOE". That consists of the following steps: first identify the critical input variables (the ones that mostly affect the outputs) and their ranges. Then run different simulation cases corresponding to various "levels" (high, medium and low values) of the critical input variables as in a design set of experiments (DOE). The outputs generated are then subjected to regression analysis to provide a "transfer function". The transfer function is easier to handle for design purposes since it contains fewer input variables and requires much less computational time than does the full process model. The "virtual DOE" approach should not be used when significant extrapolation is required.

POLYCARBONATE PREPARATION

To facilitate observations and for purity melt transesterification reactions were carried out in a 1 Liter glass batch reactor equipped with a solid nickel helical agitator. The reactor bottom had a breakaway glass nipple for removal of the final melt. To remove any sodium from the glass the reactor was soaked in 3N HCl for at least 12 hours followed by a soak in 18 Mohm water for at least 12 hours. The reactor was then dried in an oven overnight and stored covered until use. The temperature of the reactor was maintained using a fluidised sand bath with a PID controller. The temperature was measured near the reactor and sand bath interface. The pressure over the reactor was controlled by a nitrogen bleed into the vacuum pump downstream of the distillate collection flasks and measured at higher pressures (760 mmHg–40 mmHg) with a mercury barometer and at lower pressures (40 mmHg–1 mmHg) with an Edwards pirani gauge.

The reactor was charged with solid Bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed and the atmosphere was exchanged with nitrogen three times. With the final nitrogen exchange the reactor was brought to near atmospheric pressure and submerged into the fluidised bath which was at 180° C. After five minutes agitation was begun at 250 rpm. After an additional ten minutes the reactants were fully melted and a homogeneous mixture was assumed. Tetramethyl ammonium hydroxide (Sachem, $1.32 \times 10^{-4}$ mol) and NaOH (J. T. Baker, $5.00 \times 10^{-7}$ mol) were added sequentially after being diluted to the proper concentrations (0.220 M TMAH and $5.00 \times 10^{-3}$ M NaOH) with 18 Mohm water. After the final catalyst was added timing began and the temperature was ramped to 230° C. in five minutes. Once at temperature the pressure was reduced to 180 mmHg and phenol distillate was immediately observed. After 25 minutes the pressure was again reduced to 100 mmHg and maintained for 45 minutes. The temperature was then ramped to 260° C. in five minutes and the pressure was lowered to 15 mmHg. These conditions were maintained for 45 minutes. The temperature was then ramped to 270° C. in five minutes and the pressure was lowered to 2 mmHg. These conditions were maintained for 10 minutes. The temperature was then ramped to the final finishing temperature in five minutes and the pressure was reduced to 1.1 mmHg. The finishing temperature was 310° C. After 30 minutes the reactor was removed from the sand bath and the product polymer melt was poured into liquid nitrogen to quench the reaction.

Fries determination (ppm) was obtained by KOH mediated hydrolysis of the product polycarbonate.

Number average molecular weight ($M_n$) was obtained by gel permeation chromatography (GPC) analysis of the product polycarbonate. Standards of polystyrene were used to construct a universal calibration against which polycarbonate could be measured using the Mark-Houwink equation. The temperature of the columns was 25° C. and the mobile phase was chloroform.

Examples 1–6 were run as batch reactions according to the general experimental protocol described above and serve to validate the process model used in the present invention. The experimental protocol employed was modeled in POLYMERS PLUS™ and was treated as five reactors in series to accommodate the temperature and pressure ranges used. Each of the 5 reactors was treated as a plug flow reactor. Data are provided in Table 1 which illustrate the sensitivity of both the value of $M_n$ and the value of percent endcapping (%EC) to changes in the starting molar ratio of diphenyl carbonate (DPC) to bisphenol A (BPA). The experimental values obtained for $M_n$ and %EC ($M_n$ found and %EC found) accord well with those values predicted ($M_n$ predicted and %EC predicted) by the process model using the molar ratio of DPC to BPA as an input and calculating values for $M_n$ and percent endcapping using the reaction conditions, temperature and pressure ranges, as well as the characteristics of the 1 liter glass batch reactor employed.

| Example | DPC/BPA | $M_n$ found | % EC found | $M_n$ predicted | % EC predicted |
|---|---|---|---|---|---|
| 1 | 1.08 | 8740 | 52% | 8753 | 58.0 |
| 2 | 1.11 | 8648 | 74% | 8412 | 75.3 |
| 3 | 1.140 | 8410 | 90.1% | 7785 | 85.7 |
| 4 | 1.155 | 8424 | 90.1% | 7483 | 88.9 |
| 5 | 1.170 | 7180 | 96.6% | 7209 | 91.3 |
| 6 | 1.20 | 7070 | 98.4% | 6754 | 94.5 |

Example 7

A target polycarbonate having a predetermined molecular weight and percent endcapping is selected for preparation in a reaction vessel, said reaction vessel forming an element of a computerized process model. The process model is then consulted to obtain a starting molar ratio of starting materials diphenyl carbonate and bisphenol A, and to obtain a reaction temperature regime, a reaction pressure regime, and a reaction time, such that the effective molar ratio of diphenyl carbonate to bisphenol A in the product polycarbonate is predicted to be in a range between 1.0 and about 1.03. The reactants, bisphenol A and diphenyl carbonate are charged to the reactor in the ratio indicated as the starting molar ratio by the process model. A catalyst is introduced and the mixture is heated under the temperature and pressure regimes indicated by the process model while distilling by-product phenol from the reaction mixture for a time period indicated by the process model. The product polycarbonate has values of $M_n$ and %EC in accord with those the process model predicts.

The invention has been described in detail with particular reference to preferred embodiments thereof, but it will be understood by those skilled in the art that variations and modifications can be effected within the spirit and scope of the invention.

What is claimed is:

1. A method for making a polycarbonate comprising structural units derived from at least one dihydroxy aromatic compound and at least one diaryl carbonate, said method comprising the following steps:

Step (I) selecting a desired molecular weight and percent endcap of the product polycarbonate;

Step (II) consulting a computerized process model to obtain a starting molar ratio of diaryl carbonate to dihydroxy aromatic compound;

Step (III) charging an amount of dihydroxy aromatic compound and diaryl carbonate in the molar ratio indicated by the process model to a reactor to form a reaction mixture, said reactor being an element of said process model; and Step (IV) heating at a temperature and pressure indicated by the process model in the presence of a transesterification catalyst while distilling from the reactor a mixture comprising by-product hydroxy aromatic compound and diaryl carbonate to provide a polycarbonate having an effective molar ratio of diaryl carbonate to dihydroxy aromatic compound and having the desired molecular weight and percent endcapping.

2. A method according to claim 1 wherein said dihydroxy aromatic compound has structure I

I wherein $R^1$ is independently at each occurrence a halogen atom, nitro group, cyano group, $C_1$–$C_{20}$ alkyl group $C_4$–$C_{20}$ cycloalkyl group, or $C_6$–$C_{20}$ aryl group; n and m are independently integers 0–3; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

3. A method according to claim 2 wherein said dihydroxy aromatic compound is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy- 3-methylphenyl)cyclohexane; and 1,1-bis(4-hydroxyphenyl)-3,3,5-trimethylcyclohexane.

4. A method according to claim 1 wherein said diaryl carbonate has structure II

II wherein $R^4$ is at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and p and q are independently integers 0–5.

5. A method according to claim 4 wherein said diaryl carbonate is selected from the group consisting of diphenyl carbonate, bis(4-methylphenyl) carbonate, bis(4-chlorophenyl) carbonate, bis(4-fluorophenyl) carbonate, bis(2-chlorophenyl) carbonate, bis(2-fluorophenyl) carbonate, bis(4-nitrophenyl) carbonate, bis(2-nitrophenyl) carbonate, and bis(methyl salicyl) carbonate.

6. A method according to claim 1 wherein said transesterification catalyst comprises a quaternary ammonium compound, a quaternary phosphonium compound or a mixture thereof.

7. A method according to claim 6 wherein said quaternary ammonium compound has structure III

III wherein $R^5$–$R^8$ are independently a $C_1$–$C_{20}$ aliphatic radical, $C_4$–$C_{20}$ cycloaliphatic radical or a $C_4$–$C_{20}$ aromatic radical and $X^-$ is an organic or inorganic anion.

8. A method according to claim 7 wherein said anion is selected from the group consisting of hydroxide, halide, carboxylate, phenoxide, sulfonate, sulfate, carbonate, and bicarbonate.

9. A method according to claim 8 wherein said quaternary ammonium compound is tetramethyl ammonium hydroxide.

10. A method according to claim 6 wherein said quaternary phosphonium compound has structure IV

IV wherein $R^5$–$R^8$ are independently a $C_1$–$C_{20}$ aliphatic radical, $C_4$–$C_{20}$ cycloaliphatic radical or a $C_4$–$C_{20}$ aromatic radical and $X^-$ is an organic or inorganic anion.

11. A method according to claim 10 wherein said anion is selected from the group consisting of hydroxide, halide, carboxylate, phenoxide sulfonate, sulfate, carbonate, and bicarbonate.

12. A method according to claim 11 wherein said quaternary phosphonium compound is tetrabutyl phosphonium acetate.

13. A method according to claim 1 wherein said transesterification catalyst is present in an amount equivalent to from about $1 \times 10^{-8}$ to about $1.0 \times 10^{-3}$ moles transesterification catalyst per mole dihydroxy aromatic compound.

14. A method according to claim 13 wherein said transesterification catalyst further comprises at least one alkali metal hydroxide, alkaline earth hydroxide or mixture thereof.

15. A method according to claim 1 wherein said transesterification catalyst comprises at least one alkali metal hydroxide, alkaline earth hydroxide or mixture thereof.

16. A method according to claim 15 wherein the amount of said alkali metal hydroxide is in a range between about $1 \times 10^{-8}$ and about $1 \times 10^{-5}$ moles per mole dihydroxy aromatic compound employed.

17. A method according to claim 15 wherein said alkali metal hydroxide is sodium hydroxide and said alkaline earth hydroxide is calcium hydroxide.

18. A method according to claim 1 wherein said transesterification catalyst comprises at least one alkali metal salt of a carboxylic acid, or an alkaline earth salt of a carboxylic acid, or a mixture thereof.

19. A method according to claim 18 in which said alkali metal salt of a carboxylic acid is $Na_2Mg$ EDTA.

20. A method according to claim 1 wherein said transesterification catalyst comprises at least one salt of comprises the salt of a non-volatile inorganic acid.

21. A method according to claim 20 wherein said salt of a non-volatile acid is selected from the group consisting of $NaH_2PO_3$, $NaH_2PO_4$, $Na_2H_2PO_3$, $KH_2PO_4$, $CsH_2PO_4$, and $Cs_2H_2PO_4$.

22. A method according to claim 1 wherein the desired number average molecular weight ($M_n$) is in a range between about 8,000 and about 28,000 and the desired percent endcap is in a range between about 50 and about 100 percent.

23. A method according to claim 22 wherein the reaction temperature indicated by the process model is in a range between about 170° C. and about 310° C., and the and the molar ratio of diaryl carbonate to dihydroxy aromatic compound indicated by the process model is in a range between about 1.00 and about 1.20.

24. A method according to claim 23 wherein the product polycarbonate comprises Fries product in a range between about 100 and about 3000 parts per million.

25. A method according to claim 24 wherein said Fries product affords structure VI upon complete hydrolysis of the product polycarbonate

VI wherein $R^1$ is at each occurrence a halogen atom, nitro group, cyano group, $C_1$–$C_{20}$ alkyl group $C_4$–$C_{20}$ cycloalkyl group, or $C_6$–$C_{20}$ aryl group; and n and m are independently integers 0–3; and
W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

26. A method according to claim 1 wherein Step (II) comprises an iterative method comprising varying the starting molar ratio, reaction temperature range, reaction pressure range, and reaction time using said computerized process model and computing the values of $M_n$ and %EC for the product polycarbonate until the maximum coincidence possible between the calculated values and the desired molecular weight and percent endcapping is achieved.

27. A method according to claim 1 wherein the effective molar ratio of diaryl carbonate to dihydroxy aromatic compound is in a range between about 1.00 and about 1.03.

28. A method according to claim 1 wherein said computerized process model comprises a feedback control algorithm.

29. A method for making bisphenol A polycarbonate said method comprising the following steps:
Step (I) selecting a desired molecular weight and percent endcap of the product bisphenol A polycarbonate;
Step (II) consulting a computerized process model to obtain a starting molar ratio of diphenyl carbonate to bisphenol A;
Step (III) charging an amount of bisphenol A and diphenyl carbonate in the molar ratio indicated by the process model to a reactor to form a reaction mixture, said reactor being an element of said process model; and
Step (IV) heating at a temperature and pressure for a time period indicated by the process model in the presence of a transesterification catalyst while distilling from the reactor a mixture comprising by-product phenol and diphenyl carbonate to provide a polycarbonate having an effective molar ratio of diphenyl carbonate to bisphenol A and having the desired molecular weight and percent endcapping.

30. A method according to claim 29 wherein said transesterification catalyst comprises tetrabutyl phosphonium acetate in an amount corresponding to between about $1 \times 10^{-8}$ and about $1 \times 10^{-3}$ moles tetrabutyl phosphonium acetate per mole bisphenol A.

31. A method according to claim 29 wherein said transesterification catalyst further comprises sodium hydroxide in an amount corresponding to between about $1 \times 10^{-8}$ and about $1 \times 10^{-5}$ moles sodium hydroxide per mole bisphenol A.

32. A method according to claim 29 wherein the desired molecular weight (Mn) is in a range between about 8,000 and about 28,000 Daltons and the desired percent endcap is in a range between about 50 and about 100 percent.

33. A method according to claim 32 wherein the reaction temperature indicated by the process model is in a range between about 170° C. and about 310° C., the and the starting molar ratio of diphenyl carbonate to bisphenol A indicated by the process model is in a range between about 1.00 and about 1.20.

34. A method according to claim 33 wherein the product polycarbonate comprises Fries product in a range between about 100 and about 3000 parts per million.

35. A method according to claim 34 wherein said Fries product affords structure VII upon complete hydrolysis of the product polycarbonate

VII

36. A method according to claim 29 wherein Step (II) comprises an iterative method comprising varying the starting molar ratio, reaction temperature range, reaction pressure range, and reaction time using said computerized process model and computing the values of $M_n$ and %EC for the product polycarbonate until the maximum coincidence possible between the calculated values and the desired molecular weight and percent endcapping is achieved.

37. A method according to claim 29 wherein the effective molar ratio of diphenyl carbonate to bisphenol A is in a range between about 1.00 and about 1.03.

38. A method according to claim 29 wherein said computerized process model comprises a feedback control algorithm.

* * * * *